INVENTOR.
SEYMOUR ROSIN

United States Patent Office 3,442,575
Patented May 6, 1969

3,442,575
OPTICAL SCANNING SYSTEM
Seymour Rosin, Massapequa, N.Y., assignor to
Bell Aerospace Corporation
Continuation-in-part of application Ser. No. 366,566,
May 11, 1964. This application Mar. 4, 1965, Ser.
No. 440,219
Int. Cl. G02b 17/04
U.S. Cl. 350—202   11 Claims

ABSTRACT OF THE DISCLOSURE

An optical system for scanning terrain and like models and having an unusually large angular field of view. The large field of view is achieved by the combination of an objective, a stationary prism and a rotatable prism, with positive power being introduced between the stationary prism and the objective with compensatory negative power introduced between the prisms in the region of the center point of the limiting chief rays of the system.

---

The present application is a continuation-in-part application of my copending application Ser. No. 366,566, entitled, "Optical Scanning System," filed May 11, 1964, and now abandoned.

This invention concerns an optical scanning system, and more particularly, an optical scanning system which is adjustable in such a manner that the direction of the axis of a cone of rays entering the optical scanning system may be rotated about at least one predetermined axis, preferably about a plurality of axes oriented at right angles relative to each other.

Optical scanning systems of this general type are known and comprise mainly, as far as the optical equipment is concerned, a head prism assembly, an objective lens assembly and several other accessory optical subassemblies. Such a scanning system has a main optical axis and the objective lens assembly of the systems has a second optical axis which is parallel to the main optical axis and spaced therefrom in lateral direction a predetermined distance. The head prism assembly usually comprises a pair of total-reflecting prisms, one of which is arranged across the main optical axis so as to deflect a cone of incoming rays having an axis located within a plane which also contains said main optical axis in such a manner that this cone of rays is caused to enter in transverse direction the second prism which is arranged immediately adjacent to the first prism and to be deflected by the second prism in the direction of said second optical axis into the objective lens system. The first one of the two prisms is rotatable about an axis transverse of the main optical axis so that scanning can be carried out by such rotation of the first prism although only in a plane which is the one which contains the main optical axis and is transverse to the axis of rotation of that rotatable prism. However, if additionally the entire optical scanning system is rotated about its main optical axis, the scanning operation can be extended in any desired direction. Since after deflection through the pair of prisms the incoming cone of rays leaves the objective lens system in the direction of the above mentioned second optical axis, accessory optical devices are provided for returning this deflected cone of rays into the direction of the main optical axis.

In conventional optical scanning systems of the general type described above the prisms of the head prism assembly are standard prisms having each two faces through which the cone of rays enters and exits, respectively, and which extend at 90° relative to each other and also at 45° relative to a third face which reflects the light internally. In such conventional prism systems the apex angle of the cone of light which leaves the second prism and enters the objective lens system is identical with the angle of the cone of rays which enters the first i.e., the rotatable prism. This means that the area of observation of the entire system is restricted to this angle of the incoming cone of rays. For instance, in a conventional and otherwise satisfactory system this angle amounts to 50°.

It has been found highly desirable to take steps for increasing, if possible, this angle of the cone of observation. If the optical system were of telescopic nature only, ordinary and well known steps could be taken for changing, or rather increasing, the angle of the cone of observation. However, in the case of an optical scanning system including the deflecting head prism assembly such ordinary and well known steps cannot be applied.

In view of the above, it is one object of this invention to provide for an optical scanning system of the type and class set forth above in which the angle of the cone of rays entering the rotatable prism is considerably larger than the angle of the cone of rays entering the actual objective lens system and substantially greater than in the scanning systems according to the prior art.

It is another object of this invention to provide an optical system as mentioned above which is comparatively simple in structure and which can be produced by conventional means and steps of manufacture.

It is still a further object of this invention to provide an optical scanning system as set forth in which the angle of the cone of observation is substantially 80% larger than the angle of the bundle of rays entering the actual objective lens system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
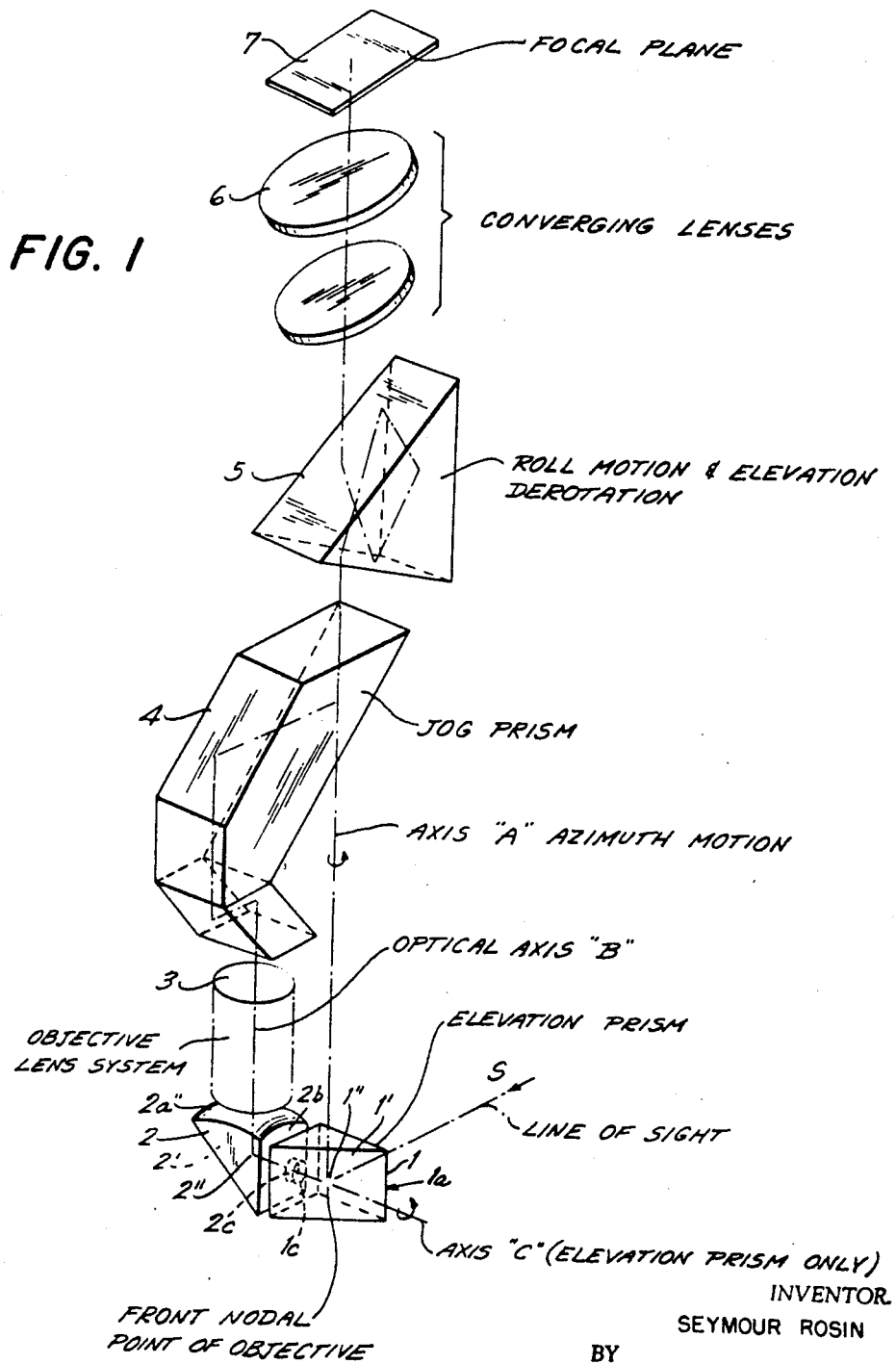
FIG. 1 is a diagrammatic exploded perspective view of an optical scanning system according to one embodiment of the present invention, some practically necessary elements of the system being omitted because they are not essential for understanding the invention.

Referring to FIG. 1 it can be seen that an optical scanning system to which the invention applies comprises essentially a pair of front prisms 1 and 2, an objective lens system 3, and a correcting or "jog" prism 4. The entire scanning system has a main optical axis A across which the first prism 1 is located while the objective lens system 3 has a second optical axis B which is parallel with axis A and spaced therefrom laterally a predetermined distance. The prism 1 is rotatable about an axis C which is transverse of both the axes A and B so that the line of sight S or the axis of a cone of rays entering the prism 1 can be rotated within a plane which includes both the axis A and the line of sight S. The axis S of the entering cone passes through the one lateral face 1a of the prism 1 and is internally reflected by the reflecting face 1′ at the point 1″ thereof in the direction of the axis C whereafter it passes through the adjacent or opposite lateral faces 1b and 2b of prisms 1 and 2, respectively, and is again reflected at the point 2″ in the reflecting face 2′ of the prism 2. The axis of the thus reflected beam is now coaxial with the axis B of the objective lens system 3. No details of the objective lens system are shown in the drawing because these details have no bearing on the invention.

The cone of rays emerging from the exit side of the objective system 3 in the direction of the optical axis B is now returned by multiple deflection in a conventional multiple prism 4 into the direction of the main axis A.

For obvious reasons there would follow now in a complete optical scanning system, although not illustrated in FIG. 1, a focusing lens system and a so-called central package including a diaphragm through which the rays of light pass toward the rear end of the system. There follows, however, in the present case, an important element, namely the so-called roll prism 5. This prism 5 is rotatable also about the main optical axis A. The prism 5 serves two purposes. First, it may be rotated by itself independently of the rest of the optical system so that in this manner the picture received along the line of sight S at the front end is rotated as it passes through prism 5. Second, it has to be rotated simultaneously with the rotation of the rotatable prism 1 about its axis C because this last mentioned rotation causes also a rotation of the picture which rotation is then compensated by the corresponding and simultaneous rotation of the roll prism 5.

After the roll prism 5 may follow the converging lenses 6 which have the only purpose of concentrating the image in the focal plane 7, e.g., for optical observation or for recording by suitable recording means.

Figure 3:
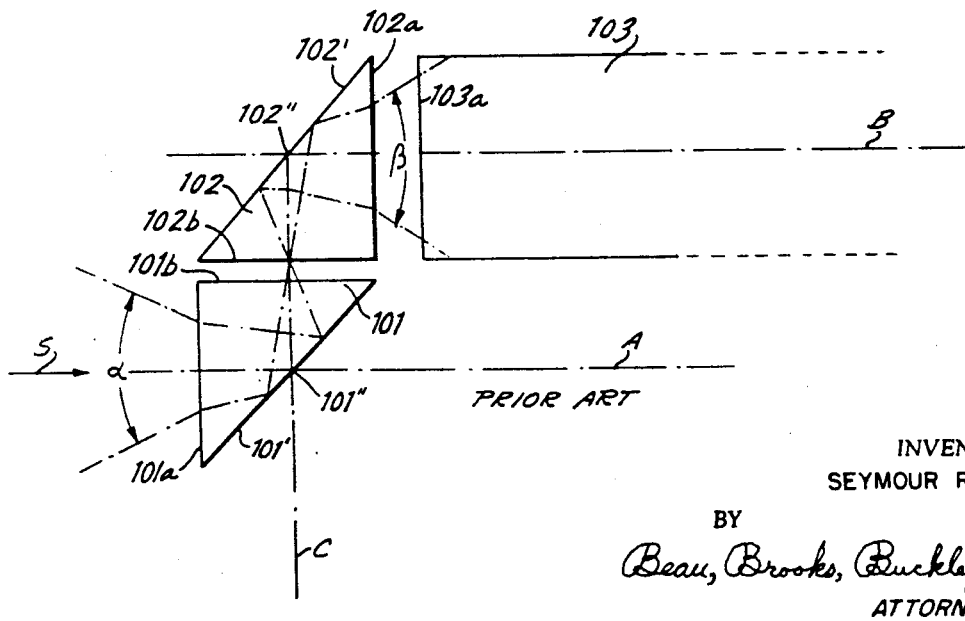
FIG. 3 is a diagrammatic plan view illustrating characteristics of the prior art in order to better explain the invention.

FIG. 3 diagrammatically illustrates the state of the art. It will be understood that the illustration of FIG. 3 is taken in a plane which contains both the axes A and B. As compared with FIG. 1, the axis S of the entering cone of rays and prism 101 are rotated 90° about axis C so that reflecting surfaces 101′ and 102′ of the prisms 101 and 102, respectively, are parallel with each other. The entrance surface 103a of the objective lens system 103 is flat, and flat are also the surfaces 101a, 101b, 102a, 102b, through which the rays entering this system in the direction of the line of sight S pass between and after reflections at the surfaces 101′ and 102′, respectively.

Consequently, in such a conventional system the opening angle β of the cone of rays entering the objective system 3 and characteristic thereof is identical with the angle α of the cone of rays entering prism 101 in the direction S. However, it will be understood by all those skilled in the art that depending upon the refractive index of the material of the prisms 101 and 102 the angles α and β of the cones of rays will not appear at the same magnitude inside the prisms 101 and 102, but will be substantially smaller, but nevertheless symmetrical in both directions from the center point of the chief rays which is ordinarily located where the transverse axis C penetrates the surfaces 101b and 102b. For instance, if the angle β characteristic of the objective lens system 103 is 50° then the corresponding angle or beam spread inside the prisms may be 30°.

In accordance with the present invention, means is employed in the region between the prism 2 and the objective 3 to introduce positive power into the system and compensating negative power is introduced into the system adjacent the center point of the chief rays of the system. The means contributing the positive power may be constituted as a refracting curved surface 2a″ of the prism 2 in FIG. 1, the curved surface 2a″ being of such a radius that the rays of the 50° cone emerging from this surface 2a″ are all radial relative to the surface. In this case the angle of the cone of rays inside the prism which emerges at the surface 2a″ would have the same value of 50° as the cone of rays outside the surface 2a″. For the same reason, the converging cone of rays starting from the surface 1a toward the above mentioned center of chief rays would likewise have the same angle of 50°. However, this converging cone of rays starting at the inside of the surface 1a would be caused by, or derived from, an outside cone of rays the angle of which is considerably larger than the angle of the cone of rays inside the prism system, namely in this example in the neighborhood of 90° provided that the refractive index of the material is suitably chosen, for instance in the range of about 1.8.

Figure 2:
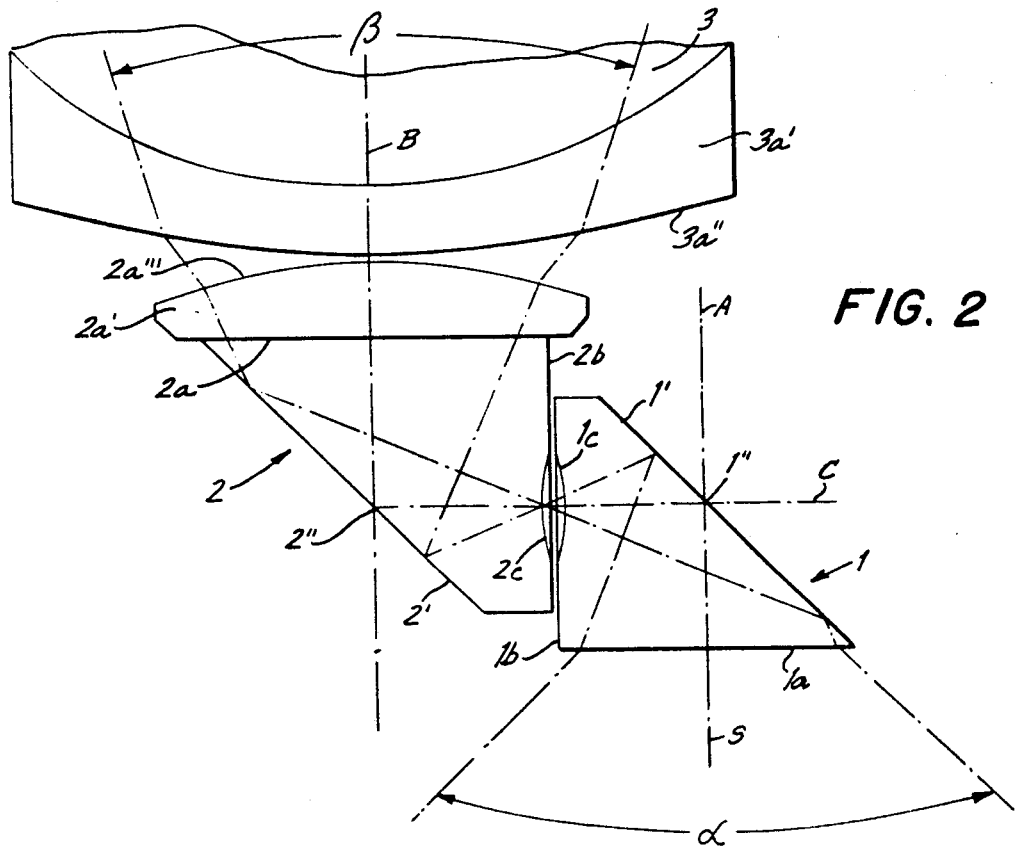
FIG. 2 is a fragmentary diagrammatic plan view of the prism assembly of the optical scanning system and of a portion of the objective lens system according to a modified embodiment, at a larger scale.

However, it will be understood that by the addition of the refracting curved surface 2a″ on the stationary prism 2 in FIG. 1, a substantial amount of positive power has been added to the optical system. For obvious reasons it is therefore necessary and desirable to compensate for this added positive power by a certain amount of negative power introduced into the system. It has been found highly advantageous and practical to provide for this negative compensating power by arranging in the adjacent and opposite air surfaces 1b and 2b of the prisms 1 and 2, respectively, concave refracting surface portions 1c and 2c, respectively, whose areas are substantially smaller than the areas of the square air surfaces 1b and 2b as illustrated in FIGS. 1 and 2. This position selected for adding this negative power is most convenient because in that area the beam passing through the prism system has the smallest cross section.

As a more convenient way in manufacture, it would be advisable not to produce the refracting convex curved surface 2a″ directly on the prism body 2 but rather to add a plano convex lens 2a′ which has a flat back surface with which it is cemented onto the flat surface 2a of the prism 2 while the desired convex air surface 2a″ is provided on the outer side of such lens, as in the lens element 2a′ in FIG. 2.

It has been found that optical difficulties result if the entire positive power is concentrated on the convex surface 2a″. Therefore, in the preferred embodiment of the invention illustrated by FIG. 2, the power of the means contributing the total positive power required for the solution of the main problem is divided into two substantially equal halves by providing a lens element 3a′ on the front portion of the objective lens system 3 which lens element has a convex refracting air surface 3a″ facing the curved convex surface 2a‴ of the lens 2a′ carried by the stationary prism 2. The surface 2a‴ is thus correspondingly less convex than is the surface 2a″ of FIG. 1.

By way of example, in a practical and successful embodiment of the invention the following materials and data have been used. The prisms 1 and 2 were made of a glass of the type LaSF 3 having a refractive index of 1.8069. The sides of the square prism faces 1a, 1b, 2a, 2b are 6.6 mm. long. The radius of curvature of the two concave refracting face portions 1c and 2c was 15.56 mm. and the diameter thereof about 2 mm. The radius of curvature of the convex surface 2a‴ was 12.25 mm. and the lens 2a′ was made of the same material as the prism 2. Finally the lens element 3a′ on the objective lens system was made of a glass material SF 10 with a refractive index of 1.7283 and the radius of curvature of surface 3a″ was 22.59 mm. All of the above given refractive indices refer to the wavelength of the D-line of the spectrum.

Figure 4:
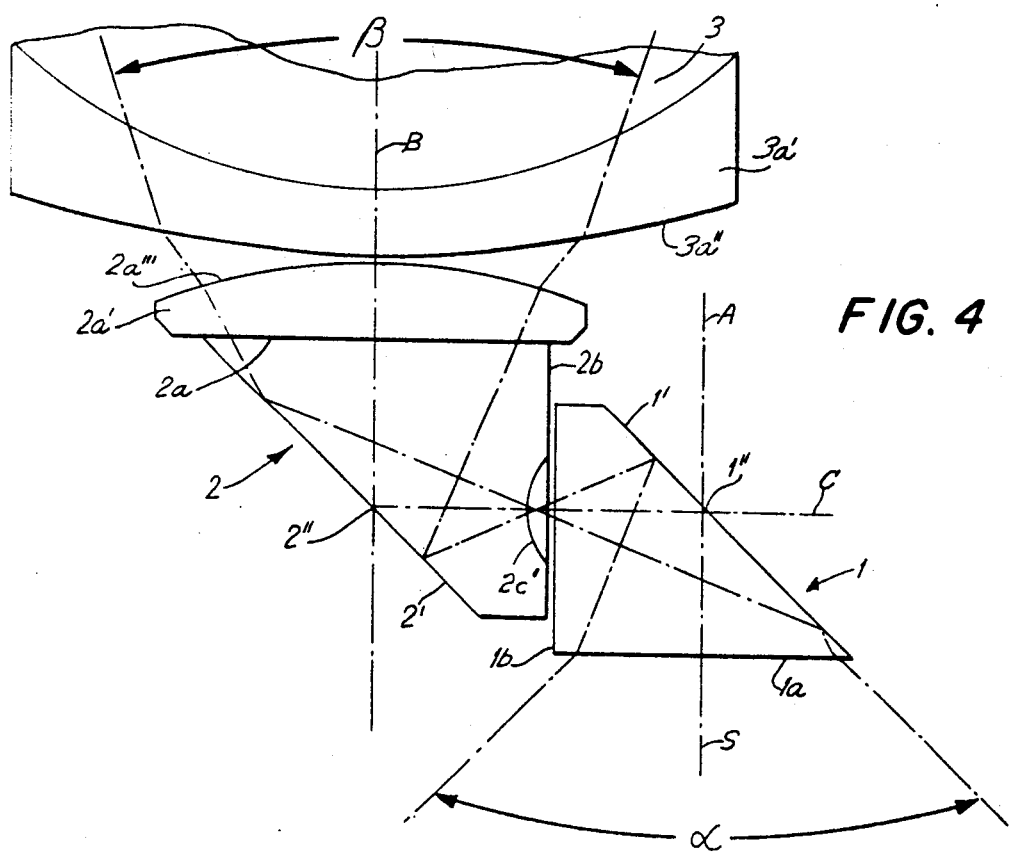
FIG. 4 is a fragmentary plan view illustrating a modified prism assembly.

The exact centering of the turnable prism 1 is difficult in the embodiments of FIGS. 1 and 2 in which this prism is provided with the concave refracting face 1c. In the embodiment of FIG. 4, a concave refracting face 2c′ of twice the required negative power is formed in the surface 2b and the air face 1b of prism 1 remains planar. Consequently, the radius of curvature of face 2c′ in the modification of FIG. 4 is half the radius of curvature of the faces 1c and 2c in the embodiment of FIG. 2, and is 7.78 mm. when the other lenses of the scanning system are designed in accordance with the numerical example described with reference to FIG. 2.

It can be seen from the above that in accordance with the invention in an extremely efficient and convenient manner the angle of the cone of observation of an optical scanning device of the system mentioned can be very considerably increased whereby the value and the usefulness of the instrument is greatly enhanced.

It will be understood that each of the elements described above, or two or more together, may also find a useful application in other types of an optical scanning system differing from the types described above.

While the invention has been illustrated and described as embodied in an optical scanning system including optical means cooperating with a system of prisms for increasing the angle of observation, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an optical system having a main optical axis and including an objective lens system having a second optical axis parallel with, and laterally offset from, said main optical axis, said objective lens systems having a predetermined maximum apex angle for a cone of rays in air which usefully may enter the objective lens system, said apex angle being defined by the limiting chief rays of the optical system,
   stationary reflecting prism means having an exit face spaced closely adjacent to said objective lens system and an entrance face normal to an adjustment axis perpendicular to said main and second axes, the center point of the chief rays of the system lying closely adjacent said entrance face of said stationary reflecting prism means, and said stationary reflecting prism means having a plane reflective surface directing light from its entrance face to its exit face,
   rotatable reflecting prism means having an exit face closely adjacent said entrance face of said stationary reflecting prism means and being rotatable about said adjustment axis, said rotatable reflecting prism means having a plane entrance face for an incoming cone of rays having an axis located within a plane perpendicular to said adjustment axis and also containing said main optical axis, and said rotatable reflecting prism means having a plane reflective surface directing light from its entrance face to its exit face so that after double deflection by said stationary and rotatable reflecting prism means said axis of the cone of rays entering said rotatable reflecting prism means coincides with said second optical axis,
   said system including means for introducing positive power into the system to decrease the apex angle of said cone of rays entering said objective lens system with respect to the apex angle of said cone of rays entering said rotatable reflecting prism means whereby said apex angle included between the limiting chief rays of the system as they enter said rotatable reflecting prism means greatly exceed said predetermined maximum apex angle which usefully may enter said objective lens system,
   and said system also including means closely adjacent said center point of the chief rays of the system for introducing negative power into the system to compensate said positive power.

2. In a scanning system as defined in claim 1, wherein said means introducing positive power comprises a lens member cemented to the exit face of said stationary reflecting prism means.

3. In a scanning system as defined in claim 1, wherein said means introducing positive power comprises a lens member cemented to the exit face of said stationary reflecting prism means and a lens member cemented to the entrance face of said objective lens system.

4. In a scanning system as defined in claim 3, wherein said positive power is substantially equally divided between said lens members.

5. In a scanning system as defined in claim 3, wherein said negative power is provided by concave surfaces at the opposing faces of said stationary and rotatable reflecting means.

6. In a scanning system as defined in claim 5, wherein said negative power is substantially equally divided between said concave surfaces.

7. In a scanning system as defined in claim 1, wherein said negative power is provided by concave surfaces in the opposing faces of said stationary and rotatable reflecting prism means.

8. In a scanning system as defined in claim 7, wherein said negative power is substantially equally divided between said concave surfaces.

9. In a scanning system as defined in claim 1, wherein said negative power is provided solely on said entrance face of said stationary reflecting prism means.

10. In a scanning system as defined in claim 9, wherein said means introducing positive power comprises a lens member cemented to said stationary reflecting prism means and a lens member cemented to said objective lens.

11. In a scanning system as defined in claim 1, wherein said means for introducing positive power into the system comprises a positive surface at the exit face of said stationary reflecting prism means.

References Cited

UNITED STATES PATENTS

| | | | |
|---|---|---|---|
| 784,852 | 3/1905 | Goerz | 350—203 |
| 1,539,579 | 5/1925 | Kucharski | 350—202 |
| 2,346,002 | 4/1944 | Bennett et al. | 350—233 |
| 2,800,052 | 7/1957 | Bechtold et al. | 350—230 |
| 3,321,265 | 5/1967 | Clave et al. | 350—319 |

FOREIGN PATENTS

| | | |
|---|---|---|
| 1,098,232 | 1/1961 | Germany. |

DAVID SCHONBERG, *Primary Examiner.*

RONALD J. STERN, *Assistant Examiner.*

U.S. Cl. X.R.

350—23, 26, 286